Nov. 15, 1932.   G. H. GIBSON   1,887,505
VARIABLE SPEED TRANSMISSION
Filed June 17, 1931
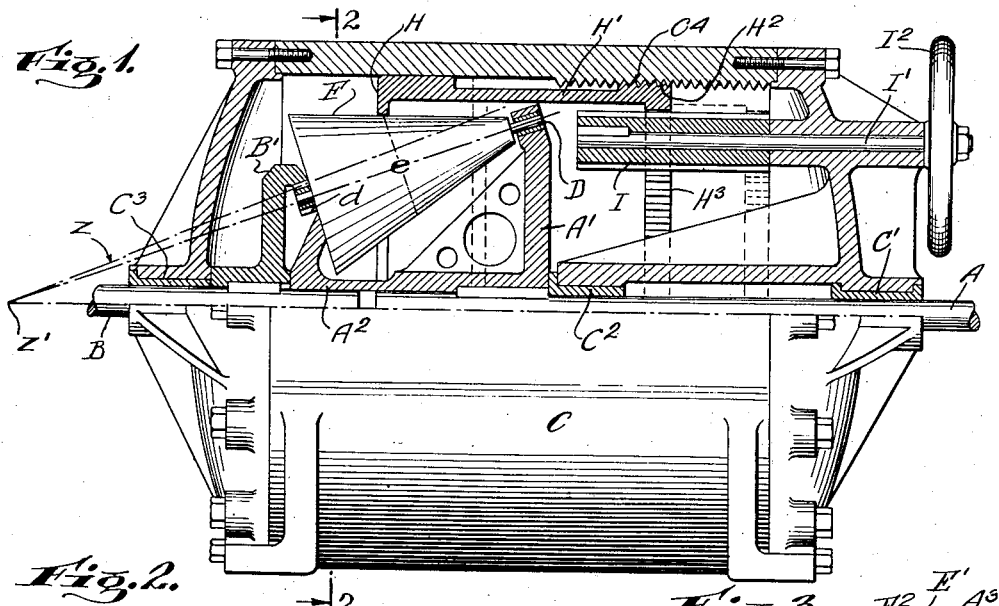
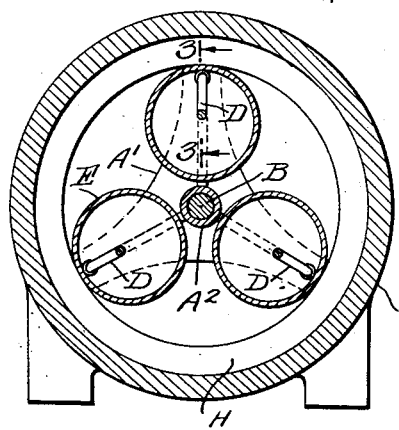
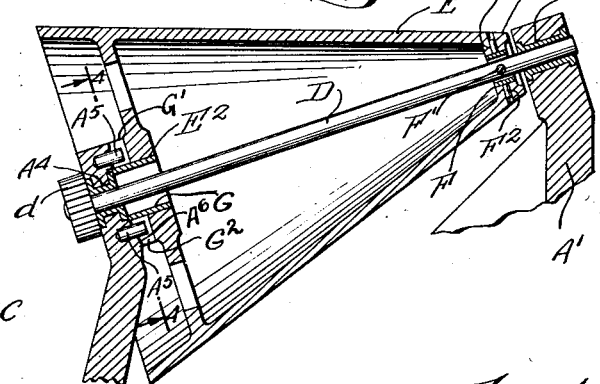
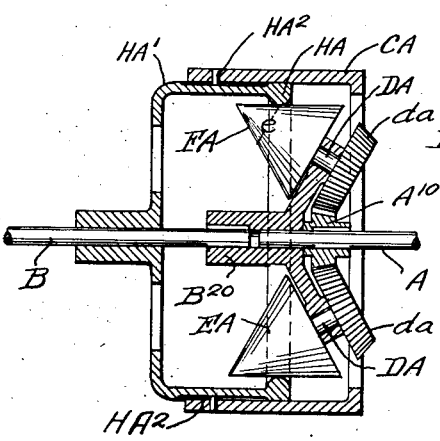
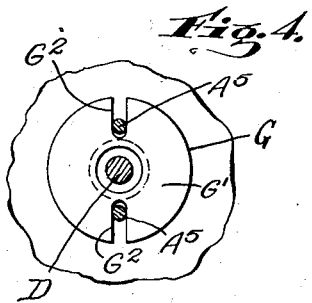
INVENTOR.
GEORGE H. GIBSON
BY John E. Hubbell
ATTORNEY Patented Nov. 15, 1932

1,887,505

UNITED STATES PATENT OFFICE

GEORGE H. GIBSON, OF UPPER MONTCLAIR, NEW JERSEY

VARIABLE SPEED TRANSMISSION

Application filed June 17, 1931. Serial No. 545,009.

The general object of the present invention is to provide improved means for connecting a driving shaft and a driven shaft in such manner that the speed ratios of the two shafts may be readily varied as conditions make desirable.

My improved transmission is of the type in which the driving and driven shafts are operatively connected by members which are carried by one of the shafts and are revoluble with respect to the latter about axes displaced from the axis of the shaft, and which are associated in a sort of planetary gear relation both with the other shaft and with a normally stationary track element, so that the relative speeds of rotation of the two shafts depend upon the angular velocity of said members about their own axes relative to the angular velocity of the shaft carrying said members. In accordance with the present invention, the relation between the two said angular velocities is varied by a relative adjustment of said members and the said non-rotatable track element.

My invention is characterized, in particular, by novel provisions for supporting the said revoluble members, and for insuring the proper contact pressure by centrifugal force action between smooth contacting surfaces of said members and one of the cooperating planetary gear elements with which said members are in rolling contact. My invention is also characterized by special features of construction and arrangement contributing to the mechanical efficiency and durability of the transmission.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described preferred embodiments of the invention.

Of the drawing:

Fig. 1 is an elevation partly in section of a preferred form of transmission;

Fig. 2 is a section on the line 2—2 of Fig. 1;

Fig. 3 is a partial section on the line 3—3 of Fig. 2;

Fig. 4 is a partial section on the line 4—4 of Fig. 3; and

Fig. 5 is an elevation partly in section of a modified form of transmission.

In the drawing and referring first to the construction shown in Figs. 1–4, A represents the driving shaft, and B the driven shaft of the transmission. Those shafts are mounted in axial alignment in a stationary transmission housing C from the opposite ends of which the two shafts respectively project. The housing C is formed with bearings C' and C² for the shaft A, and with a bearing C³ for the shaft B. Keyed on the driving shaft A is a spider A'. The latter, as shown, overlaps and is provided with a bearing A² for the end of the shaft B. Journalled in the spider A' are supporting spindles D for hollow conical members E. The spider A' is provided with spaced apart bearings A³ and A⁴ for each spindle D. As shown, there are three spindles D equally spaced about the shaft A. Each spindle D has its axis in a plane radial to the shaft A, but is inclined to that shaft at an angle which is approximately half that of the conical angle of the corresponding member E, and the latter is so mounted on the spindle that its side remote from the shaft A is parallel to the latter. At its end adjacent the driving shaft each spindle D carries a bevel gear d in mesh with a large internal bevel gear B' keyed to the shaft B.

A smooth circular track H coaxial with the shaft A surrounds the members E, and the latter engage and roll along said track when the shaft A is rotated. As shown, the track H is formed by the edge of an internal flange portion of a sleeve H' which is so mounted in the casing C that while normally stationary it may be adjusted longitudinally of the shaft A. The particular means shown for effecting the longitudinal adjustment of the sleeve member H' comprise an external screw thread H² on the member H' which engages with an internal screw thread C⁴ formed on the inner wall of the member C, and means for rotating the sleeve H' in the casing C. The means shown for rotating the sleeve H' comprise an elongated spur gear I secured to a shaft I' which passes through the adjacent end head of the casing C and is provided externally of the latter with a hand wheel I². The teeth of the elongated gear I mesh with internal gear teeth H³ carried by the sleeve member H'. The rotation of the hand wheel I² thus gives the sleeve H' a rotative movement as well as a longitudinal movement, but only the latter movement is of direct significance.

Each member E is in the form of a truncated cone, and has its smaller end connected to the corresponding spindle D adjacent the end of the latter most remote from the axis of the shaft A, by a connection permitting a limited motion of the larger end of the member E toward and away from the axis of the shaft A. As shown, said connection is a gimbal joint connection, comprising a collar member F loosely surrounding the spindle D and pivotally connected to the latter by a pivot shaft F' extending diametrally through the spindle. The collar F is provided with trunnions F² which are transverse to the pivot F' and are journalled in bearings E' in the member E.

Adjacent its larger end, each member E is provided with a transverse web or spider portion formed with a central bearing aperture E² receiving a tubular bearing G. The tubular bearing G loosely surrounds the corresponding spindle D, and comprises a hub portion G' having a convex surface bearing against a concave seat A⁶ formed on the spider A' and surrounding the corresponding bearing A⁴. Said convex and concave surfaces are curved to accommodate a slight tilting movement of the member E and bearing G toward and away from the shaft A about the axis of the gimbal joint connection between the smaller end of the member E and its spindle D. The movement of the bearing member G relative to the spider A' is confined to movement in a plane radial to the shaft A by guide pins A⁵ carried by the spider and received in slots G² formed in the hub portion of the bearing member.

When the track H is in some position at the left, as seen in Fig. 1, of the gimbal joint connections between the members E and their spindles D, the rotation of the shaft A and the resultant bodily rotation of the members E about said shaft will subject the latter to a centrifugal force action holding them against the track H along which they will then roll and thus rotate the spindles D about their own axes. With the members E rolling along the track H as described, the driving shaft A will rotate the driven shaft B with a velocity which is less than that of the shaft A by an amount which depends upon the gear ratio of the gears d and B' and upon the ratio of the diameter of the track H to the diameter of the circular portion e of each member E engaged by the track H as the member E rolls along the latter. Thus, if R represents the ratio of each gear d to the gear B' and r represents the ratio of the diameter of the track H to the diameter of each circle e, the ratio of the angular velocities of the shafts B and A will be represented by the quantity $$\frac{1-Rr}{1}$$

The speed of the shaft B relative to that of the shaft A obviously may be increased or decreased by an adjustment of the track H longitudinally of the shaft A accordingly as the adjustment increases or decreases the diameter of the circular portion e of the periphery of each member E engaged by the track H, and thereby decreases or increases said ratio r.

The members E engage the track H under the action of centrifugal force, and the parts should, and readily may be proportioned to make the contact pressure large enough to eliminate objectionable slippage of the members E along the track. The contact pressure between the members E and the track H, with any given velocity of the shaft A, depends upon the axial adjustment of the track H, since each member E acts against the latter as a lever having its fulcrum formed by its gimbal joint connection to the corresponding spindle D. While the axial adjustment of the track H to increase or decrease the speed of the shaft B does not change the centrifugal force acting on each member E, it does decrease or increase the leverage through which that force is transmitted to the track H. This is desirable, because with any given load or retarding torque impressed on the driving shaft, the contact pressure required to prevent slippage between each member E and the track H increases and decreases as the diameter of said circle e and the speed of the shaft B relative to that of the shaft A decrease and increase, respectively.

As will be readily apparent to those skilled in the art, the torque about the common axis of A and B which the teeth of the gear B' exert against the teeth of each gear d, will be equal to the sum of two torques, one of which is that which the spider A' exerts on the corresponding spindle D, while the other is that which the track H exerts in opposing the tendency of the corresponding member E to slip instead of roll along said track. If the driving torque and speed of the shaft A remain constant as the speed of the driven shaft B is varied, the torque exerted by H varies in proportion with the difference between the speeds of the shafts A and B. In a sense, therefore, the force with which the track H opposes the tendency of each member E to slip along the track is a function of the speed reduction effected by the transmission. The torque due to the last mentioned force is smaller than the torque which the spider A' exerts on the corresponding spindle D about the axis of A and B when the adjustment of the track H is such that the ratio of the diameter of the contact circle $e$ of the member E to the diameter of the track H is greater than twice the ratio of the sine of half the angle of the pitch cone of the gear $d$ to the sine of half the angle of the pitch cone of the gear B', as it will be in the normal running.

In the usual normal condition of operation in which the driven shaft speed is relatively high and the contact pressure between the members E and the track H is relatively small, and the speed of rotation of the spindles D about their own axes is also relatively low, the frictional losses of the transmission are correspondingly smaller than when the speed of the driven shaft is relatively small. Moreover, with the described construction those losses need not be large under any operating condition, especially if the casing C is partly filled with oil, as I contemplate will ordinarily be the case.

The above mentioned quantity $$\frac{1-Rr}{1}$$

obviously becomes zero when the quantity $Rr$ becomes equal to unity. This means that when the track H is in such position that the ratio of the diameter of each circle $e$ to the diameter of the track H is equal to the gear ratio of each gear $d$ and gear B', the driven shaft B will remain stationary. In such adjustment of the apparatus, the line Z of Fig. 1 drawn through the point of contact between the track H and any member E and through the line of tangency of the pitch cone for the corresponding gear $d$ with the pitch cone of the gear B', will intersect the common axis of the shafts A and B at the point Z' at which that axis is intersected by the axis of the corresponding spindle D. The conical surface, of which the line is an element, may then roll along the track H and along the pitch cone of the gear B' without any necessary tendency for the corresponding gear $d$ and member E to impress any force on the gear B' or one the track H.

When the track H is adjusted farther towards the smaller end of the members E so that the quantity $Rr$ becomes greater than unity, the transmission tends to rotate the shaft B in a direction opposite to the rotation of the shaft A. In consequence, the apparatus shown in Figs. 1–4, may be employed to give a variable speed range of rotation of the shaft B in the direction of rotation of the shaft A, and also a more limited speed range of rotation of the shaft B in the opposite direction.

In the modified form of transmission, shown somewhat diagrammatically in Fig. 5, conical elements EA engaging an adjustable track member HA are carried by spindles DA which are loosely mounted in a spider $B^{20}$ so that in operation the members EA are permitted to be held against the track by centrifugal force action on the members. In Fig. 5 the spider $B^{20}$ is keyed to the shaft B, and gears $da$ carried by the spindles DA are in mesh with a gear $A^{10}$ keyed on the shaft A. The track HA is carried by a casing member HA' which may be adjusted longitudinally of the shaft B, but is prevented from rotating relatively to the casing body CA by spline connections $HA^2$.

In the construction shown diagrammatically in Fig. 5 as well as in that shown in Figs. 1–4, I transmit by what may be regarded as the variable speed part of the mechanism, only such fraction of the load torque as corresponds to the difference between the speeds of the driving and driven shafts. In each case, if the conical rolling elements were extended to infinity, the rate of rolling would be zero, all of the torque would be transmitted directly from the driving shaft to the driven shaft, and the two shafts would rotate at the same speed. Of course, such extension of the conical rollers is not possible in practice.

While the arrangement shown in Fig. 5 permits of the attainment of major advantages attained with the apparatus of Figs. 1–4, the apparatus of Fig. 5 is characterized by certain mechanical disadvantages avoided with the apparatus shown in Figs. 1–4. Thus, with the apparatus shown in Fig. 5 the zero speed condition of the driven shaft B is attained when the apices of the rolls EA engage the track HA. In such case, the rolls tend to bite into and wear away the apices and the track HA since the slipping which is combined with the rolling action of the cone on the track is then at a maximum. This disadvantage is avoided with the construction shown in Figs. 1–4.

With the apparatus shown in Fig. 5, also, the centrifugal force action tending to move each roller EA away from the common axis of the shafts A and B varies with the speed of the driven shaft, and is less when that speed is least and when the frictional force required at the rolling contact is greatest than when the speed of the driven shaft is high. In this respect the apparatus of Fig. 5 is less desirable than the apparatus shown in Figs. 1–4, wherein the centrifugal force action depends upon the speed of the driving shaft which may normally be constant or approximately so. As those skilled in the art will understand, the gyrostatic effect on each member E, due to its rotation about its own axis and about the axis of the driving shaft, diminishes as the member E is made more slender or is modified in form to concentrate its weight adjacent its axis. Such changes in form of a member E do not change its centrifugal force action which is not dependent on its form or disposition except as they affect the weight of the member and the distance between its center of gravity and the axis of the shaft A.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent, is:

1. A variable speed transmission comprising driving and driven elements rotatable about a common axis, a shaft journalled in one of said elements and inclined to the said axis and in rolling engagement with the other of said elements, a conical member having its side remote from said axis substantially parallel with the latter, a connection between said member and shaft compelling said member to rotate with said shaft but permitting said member to move relatively to said shaft toward and away from said axis and a track encircling the path of movement of said member and along which said member rolls, said track being adjustable to vary the ratio between the angular speed of said shaft about said axis and its angular speed about its own axis.

2. A variable speed transmission comprising driving and driven elements rotatable about a common axis, a shaft journalled in one of said elements and inclined to said axis, a planetary gear connection between said shaft and the other of said elements comprising a beveled gear carried by the last mentioned element and co-axial with said axis and a beveled gear carried by said shaft, a conical member having its side remote from said axis substantially parallel with the latter, a connection between said member and shaft compelling said member to rotate with said shaft but permitting said member to move relatively to said shaft toward and away from said axis and a track encircling the path of movement of said member and along which said member rolls, said track being adjustable to vary the ratio between the angular speed of said shaft about said axis and its angular speed about its own axis.

3. A variable speed transmission comprising driving and driven elements rotatable about a common axis, a shaft journalled in one of said elements and inclined to said axis and in rolling engagement with the other of said elements, a conical member having its side remote from said axis substantially parallel with the latter, a connection between said member adjacent its smaller end and said shaft compelling said member to rotate with said shaft but permitting said member to move relatively to said shaft toward and away from said axis, a bearing part on which said member is journalled adjacent its larger end, a guiding connection between said bearing member and the element in which said shaft is journalled permitting movement of said bearing part toward and away from said axis and a track encircling the path of movement of said member and along which the latter rolls, said track being adjustable to vary the ratio between the angular speed of said shaft about said axis and its angular speed about its own axis.

4. A variable speed transmission comprising driving and driven elements rotatable about a common axis and having shaft extensions, a shaft journalled in one of said elements and inclined to the said axis and in rolling engagement with the other of said elements, a conical member having its side remote from said axis substantially parallel with the latter, a connection between said member and shaft compelling said member to rotate with said shaft but permitting said member to move relatively to said shaft toward and away from said axis, a track encircling the path of movement of said member and along which said member rolls, a housing enclosing said elements and track and adapted to contain lubricating material and having bearings for said shaft extensions which extend through said housing, and means including an operating member extending through said housing for adjusting said track relative to the latter and the member carrying said shaft to thereby vary the ratio between the angular speed of said shaft about said axis and its angular speed about its own axis.

5. A variable speed transmission comprising driving and driven elements rotatable about a common axis, a shaft journalled in one of said elements and inclined to the said axis and in rolling engagement with the other of said elements, a hollow conical member surrounding said shaft and having its side remote from said axis substantially parallel with the latter, a gimbal connection between said shaft and said member adjacent the smaller end of the latter compelling said member to rotate with said shaft but permitting the member to move outward under the action of centrifugal force when said shaft is rotated about said axis, a bearing part on which said member is journalled adjacent its larger end, and a guiding connection between said part and the element in which said shaft is journalled permitting movement of said part toward and away from said axis and a track encircling the path of movement of said member and against which said member is held by centrifugal force when said shaft is rotated about said element, said track being adjustable relative to said member in the direction of said axis to thereby vary the ratio between the angular speed of said shaft about said axis and its angular speed about its own axis.

6. A variable speed transmission comprising driving and driven elements rotatable about a common axis, a shaft journalled in one of said elements and inclined to said axis, a planetary gear connection between said shaft and the other of said elements comprising a beveled gear carried by the last mentioned element and co-axial with said axis and a beveled gear carried by said shaft, a conical member having its side remote from said axis substantially parallel with the latter, a connection between said member and shaft compelling said member to rotate with said shaft but permitting said member to move relatively to said shaft toward and away from said axis and a track encircling the path of movement of said member and along which said member rolls, said track being adjustable to vary the ratio between the angular speed of said shaft about said axis and its angular speed about its own axis, said parts being so proportioned that by said track adjustment the ratio of the diameter of said track to the diameter of the circular portion of said member in engagement with the track may be made greater or less than the gear ratio of the first and second mentioned gears.

7. A variable speed transmission comprising driving and driven elements rotatable about a common axis, a shaft journalled in one of said elements and inclined to the said axis, and having a portion in rolling engagement with a portion of the other of said elements surrounding said axis, a conical member having its side remote from said axis substantially parallel with the latter, a connection between said member and shaft compelling said member to rotate with said shaft but permitting said member to move relatively to said shaft toward and away from said axis, and a track encircling the path of movement of said member and along which said member rolls, said track being adjustable in the direction of said axis and the parts being so proportioned that by such track adjustment the ratio of the diameter of the circular portion of said member in engagement with said track to the diameter of said track may be made greater or less than the ratio of the diameter of the first mentioned portion to the diameter of the second mentioned portion.

8. A variable speed transmission comprising driving and driven elements rotatable about a common axis, a shaft journaled in one of said elements and inclined to the said axis and in rolling engagement with the other of said elements, a conical member surrounding said shaft, a connection between said member and shaft compelling said member to rotate with said shaft but permitting said member to move relatively to said shaft toward and away from said axis and a track encircling the path of movement of said member and along which said member rolls, said track being adjustable to vary the ratio between the angular speed of said shaft about said axis and its angular speed about its own axis.

9. A variable speed transmission comprising driving and driven elements rotatable about a common axis, a shaft journaled in one of said elements and inclined to the said axis and in rolling engagement with the other of said elements, a conical member surrounding said shaft, a connection between said member and shaft at a point between the center of gravity of said member and its smaller end, compelling said member to rotate with said shaft but permitting said member to move relatively to said shaft toward and away from said axis and a track encircling the path of movement of said member and along which said member rolls, said track being adjustable to vary the ratio between the angular speed of said shaft about said axis and its angular speed about its own axis.

10. A variable speed transmission comprising driving and driven elements rotatable about a common axis, a shaft journaled in one of said elements and inclined to the said axis and in rolling engagement with the other of said elements, a conical member surrounding said shaft, a connection between said member and shaft at a point between the center of gravity of said member and one end, compelling said member to rotate with said shaft but permitting said member to move relatively to said shaft toward and away from said axis and a track encircling the path of movement of said member and along which said member rolls, said track being adjustable to vary the ratio between the angular speed of said shaft about said axis and its angular speed about its own axis.

11. A variable speed transmission comprising driving and driven rotatable elements, a shaft journaled in one of said elements and in rolling engagement with the other of said elements, a round member surrounding said shaft and flexibly attached thereto so that the axes of shaft and member always intersect, a non-rotating track in rolling engagement with said member and means for shifting said track to engage the member along different peripheral portions of the member.

12. A variable speed transmission comprising driving and driven elements rotatable about a common axis, a shaft journaled in one of said elements and inclined to the said axis and in rolling engagement with the other of said elements, a conical member surrounding said shaft, a connection between said member and shaft compelling said member to rotate with said shaft but permitting said member to move relatively to said shaft toward and away from said axis and a track encircling the path of movement of said member and along which said member rolls, said track being adjustable along the length of said cone to either side of the point where the ratio of the cone diameter to the track diameter is equal to the ratio of the shaft diameter at its point of rolling on said other element to the diameter of the other element.

Signed at Philadelphia, in the county of Philadelphia, and State of Pennsylvania this fifteenth day of June, A. D. 1931.

GEORGE H. GIBSON.